United States Patent [19]

Kondo et al.

[11] Patent Number: 5,618,431
[45] Date of Patent: Apr. 8, 1997

[54] METHOD OF CLEANING FLOATING FILTER MEDIUM FOR BIOLOGICAL FILTERING APPARATUS

[75] Inventors: Masao Kondo; Senichi Hozo; Michihiro Fujii, all of Osaka-fu, Japan

[73] Assignee: Best Industries, Inc., Osaka-fu, Japan

[21] Appl. No.: 613,721

[22] Filed: Mar. 12, 1996

[51] Int. Cl.⁶ ................................. C02F 3/06
[52] U.S. Cl. ........................... 210/618; 210/794
[58] Field of Search ................. 210/616–618, 210/631, 792–796, 150, 151

[56] References Cited

U.S. PATENT DOCUMENTS

| | | | |
|---|---|---|---|
| 4,589,927 | 5/1986 | Allen et al. | 210/618 |
| 4,663,046 | 5/1987 | Feldkirchner et al. | 210/616 |
| 4,749,493 | 6/1988 | Hicks | 210/617 |
| 5,202,027 | 4/1993 | Stuth | 210/618 |
| 5,217,616 | 6/1993 | Sanyal et al. | 210/617 |
| 5,478,473 | 12/1995 | Oshima | 210/617 |
| 5,486,291 | 1/1996 | Todd et al. | 210/617 |

FOREIGN PATENT DOCUMENTS

| | | |
|---|---|---|
| 62-13043 | 3/1987 | Japan. |
| 63-21553 | 5/1988 | Japan. |
| 3-242294 | 10/1991 | Japan. |

*Primary Examiner*—Thomas G. Wyse
*Attorney, Agent, or Firm*—Griffin, Butler, Whisenhunt & Kurtossy

[57] ABSTRACT

A method of preparing and cleaning a floating filter medium for a biological cleaning apparatus includes the steps of forming a filter layer by placing in a treating tank a granular floating filter medium having a specific gravity of about 0.3 or less and a particle size of 1 to 15 mm. Wastewater enters the tank and flows through the filter layer. Excess sludge is separated and removed from the filter medium by discharging an amount of water from the treating tank, from below the filtered layer, equivalent to 0.5 to 1.5 times the filling amount of the filter medium in a time period of between 5 to 90 seconds.

8 Claims, 10 Drawing Sheets

METHOD OF CLEANING FLOATING FILTER MEDIUM FOR BIOLOGICAL FILTERING APPARATUS

BACKGROUND OF THE INVENTION

The present invention relates to a cleaning method for cleaning floating filter medium of biological filtering apparatus for use in purification treatment of night soil, domestic miscellaneous wastewater, or the like.

A feature of biological filtering apparatus is that a required volume of a treating tank therefor can be of a reduced size as compared with conventional contact-type aerobic treating apparatus or the like, so that treating apparatus can be notably reduced in size.

In such biological filtering apparatus, usually, a filter layer is formed by filling a treating tank with a filter medium which, because it has a specific gravity smaller than 1.0, floats in water. The filter medium is adhered with sludge containing aerobic or anaerobic microorganisms. As wastewater is passed through the filter layer, organic pollutants in the wastewater are treated and suspended solids are separated therefrom at the same time.

When a filtering treatment of the wastewater with the biological filtering apparatus thusly continues for a certain time, some organic pollutants accumulate in the filter layer as sludge, while suspended solids similarly become fixed and remain in the filter layer. As a result, resistance of the filter layer to wastewater flow passing therethrough gradually increases, and biological filtering effectiveness drops.

Accordingly, it is necessary to prevent complete closure of the filter layer by periodically cleaning the accumulated excess sludge and suspended solids and discharging them outside the system; thus, generally, cleaning water is passed through the filter layer in a downward flow at a constant flow rate, and the sludge is washed away while "spreading out" the filter layer with the cleaning water flow.

In the case of, however, a filter medium of an extremely small specific gravity, such as a foamed plastic filter medium, the filter layer is not sufficiently spread unless a flow velocity of the cleaning water is quite fast; as a result, a huge volume of cleaning water is needed, and an overall treating capacity of the biological filtering apparatus is lowered.

To solve these problems, various methods have, hitherto, been developed.

For example, (1) agitating blades have been provided beneath a filling layer (filter layer) formed in a treating tank, for mechanically spreading the filter layer during the cleaning operation (Japanese Laid-open patent 3-242294); and (2) a floating filter medium has been gradually and continuously drawn from inside to outside a treating tank, where it has been cleaned and then put back into the treating tank (Japanese Patent Publication 63-21553).

In the respective methods (1) and (2), the agitating blades have been installed in the treating tank, and the circulating and cleaning mechanism has been provided outside the tank. These treating apparatus themselves have been large in size, and operation and maintenance thereof have required much labor.

In a system which attempts to solve these problems, as shown in FIG. 10, a draft tube 2 and compressed-air feed pipe 3 are disposed in a treating tank 1 which has a crude water feed pipe 7 and a wastewater discharge pipe 8. Air 5 is injected from the compressed air feed pipe 3 when a filter layer 4 is being cleaned in order to generate an ascending stream 6 of wastewater in the draft tube 2, so that the wastewater in the treating tank 1 is caused to flow in the arrow direction; thereby forcefully spreading the filter layer 4 (Japanese Patent Publication 62-13043).

In such technology, however, with the wastewater being caused to flow by the ascending stream 6 alone, it is difficult to completely separate and remove the sludge and solid matter affixed to the filter medium 4a by sufficiently spreading the filter layer 4, and, in the case of a very light filter medium 4a such as foamed styrol, it is impossible to completely clean it. Hence, a circulation time of the flowing wastewater must be unduly long. After the circulation is stopped, in order to cause the sludge to settle, a cleaning water discharge valve 9 is opened, and the filter medium 4a is cleaned again by the supernatant in the treating tank 1.

As a result, a huge volume of cleaning water is needed, and the cleaning takes much time and labor, while various problems arise.

It is an object of this invention to provide a method for cleaning a floating filter medium for biological filtration, that: (1) does not require a mechanism for cleaning the filter medium separately inside or outside a treating tank, which, in turn, requires an unduly large purifying apparatus; (2) does not require the fluidization, or flowing, of wastewater by air pump alone, which makes it difficult to sufficiently spread a filter layer when the floating filter medium is particularly light in weight, and the affixed matter cannot be sufficiently separated and removed; and (3) does not require a huge volume of cleaning water for cleaning a filter medium so that overall treating performance of the wastewater treating apparatus is decreased.

Further, it is an object of this invention to provide a method for cleaning a floating filter medium for biological filtering apparatus capable of cleaning, almost completely, even a lightweight filter medium with a small volume of cleaning water.

SUMMARY

According to principles of this invention, in a first, embodiment, a biological filtering apparatus includes a filter layer in a treating tank, the filter layer being formed of a granular floating filter medium of specific gravity of about 0.3 or less, with a particle size of 1 to 15 mm. Wastewater is passed (in an upward or downward flow) through the filter layer. Excess sludge is separated and removed from the filter medium by discharging an amount of water from the treating tank which is equal to 0.5 to 1.5 times a filling amount of the filter medium, at a lower part or below the filter layer, in 5 to 90 seconds.

The invention, in a second embodiment, has a basic construction of a biological cleaning apparatus in which a filter layer is formed by filling a treating tank with a granular floating filter medium of specific gravity of about 0.3 or less and a particle size of 1 to 15 mm, and wastewater is passed in an upward or downward flow through the filter layer. A cleaning discharge water pipe is mounted in the treating tank with its lower end being near a bottom of the treating tank; an air sump is formed at the bottom of the treating tank; a water seal is provided in the air sump; an air injection pipe is inserted into the water seal with its upper end communicating with a lower interior part of the cleaning discharge water pipe; air is supplied into the air sump to break a water sealing ability of the water seal; the air in the air sump is passed into the air injection pipe to be injected instantly into the cleaning discharge water pipe; a volume of water in the treating tank equivalent to 0.5 to 1.5 times the filling amount of the filter medium is allowed to be discharged outside the tank through the cleaning discharge water pipe from the lower part of the treating tank in 1 to 90 seconds and to flow into the air sump, and excess sludge is thereby separated and removed from the filter medium.

In the first, basic, embodiment of the invention, since the water is rapidly discharged from beneath the filter layer to outside the treating tank, the water level above the filter layer drops, and, at the same time, the filter layer itself descends in the treating tank, while maintaining its initial gathered state.

Similarly, in the second embodiment, when the water level in the water seal descends to break a seal, which is caused by the air supplied into the air sump, the air in the air sump instantly passes through the air injection pipe to be discharged through the cleaning water discharge pipe.

As a result, by momentary air flow injection, water in the bottom of the treating tank can be discharged outside the treating tank through the cleaning water discharge pipe, and water in the bottom of the tank flows into the empty air sump, so that a water level above the filter layer suddenly descends. The filer layer itself simultaneously descends in the treating tank while maintaining its initial gathered state.

As the filter layer descends, an inner upper part of the filter layer is agitated by fast descending flow caused by the discharge of water, and the inner upper filter medium, in the gathered state, is spread and thereby becomes loosened. The state of the water flow in the loosened portion of the inner upper filter medium in the filter layer undergoes complex changes.

As a result, the granular filter medium, recovers its mobility, by loosening, and makes a violent, buoyant, ascending motion due to its large difference in specific gravity from that of water, and such loosened filter medium (or elements thereof) moves spirally while floating upwardly, thereby forming a spiral agitation region at the inner upper part of the filter layer.

The thusly formed spiral agitation region is suddenly moved and expanded downwardly by buoyancy acting on the granular filter medium, and collision of the multiple filter media elements, violently moving in the agitation region against grouped filter medium below, destroys such groups and finally the entire filter region is broken into pieces, or elements.

A mechanism of this phenomenon is not theoretically explained, but by a complicated synergistic effect of a rapid downward water stream generated by a discharge of water (or the like), a descending of the filter layer, and a large buoyancy acting on elements of the filter medium, it is supposed that a vortex flow is generated inside the filter layer, which vortex flow is gradually expanded.

The filter medium, once loosened by this process, floats upwardly to gather and return to its initial state, so that the filter layer may form again.

By repetition of mutual collisions of the filter media during the violent spiral motion, after loosening, excess sludge is peeled and separated from outer surfaces of elements of the filter medium.

Furthermore, the peeled and separated excess sludge sequentially sediments, or settles, beneath the reassembled filter layer, and is discharged outside through a cleaning water discharge pipe. If necessary, moreover, a sludge discharge port may be provided at the bottom of the filtering tank.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
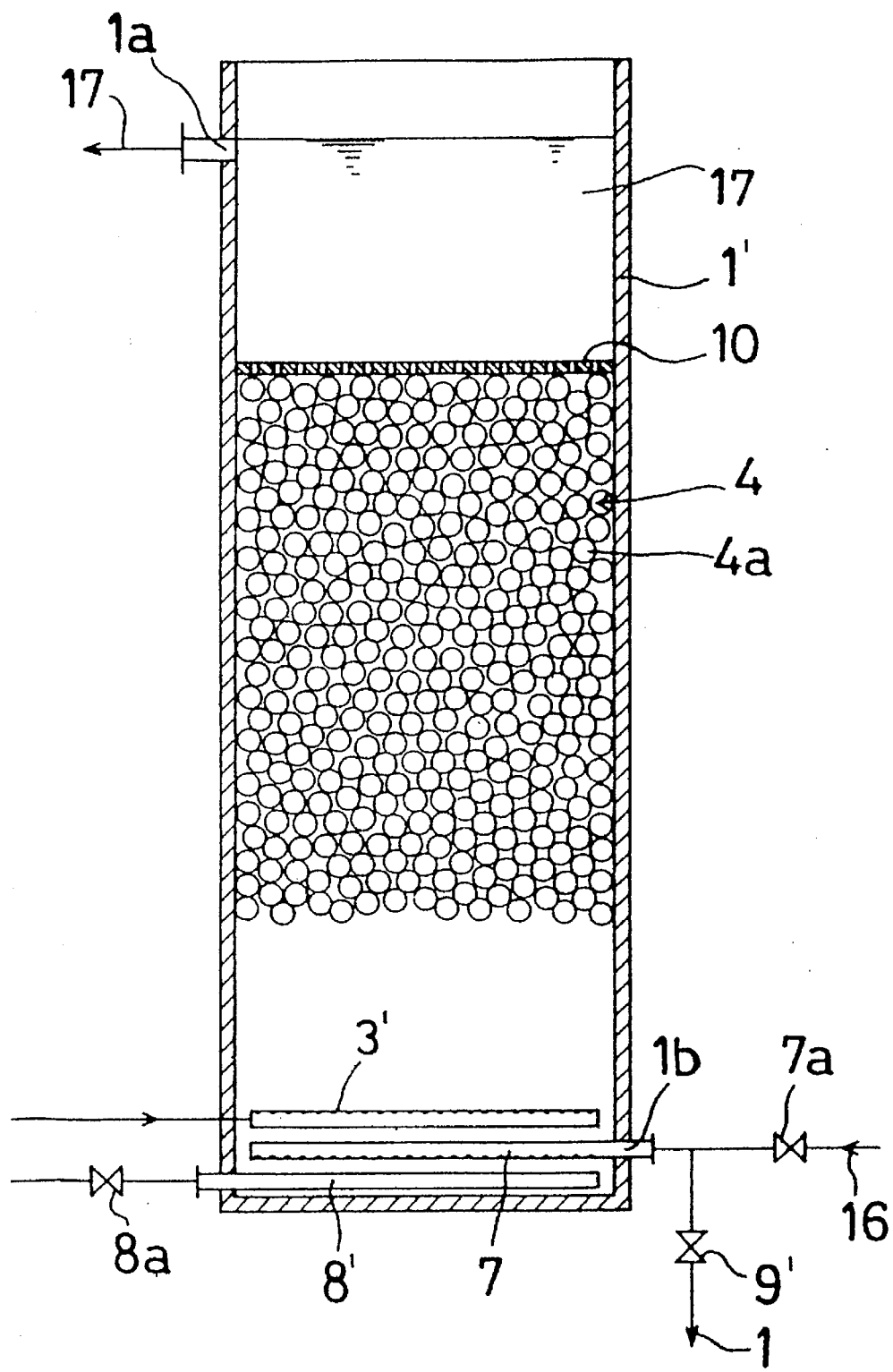
FIG. 1 is a longitudinal cross-sectional, outline, view of a biological treating apparatus according to a first embodiment of the invention.

Referring now to the drawings, the same general reference numerals are used for the same general parts as were used above for the prior art of FIG. 1 although some of the reference numerals are changed slightly by adding primes.

FIG. 1 is a longitudinal sectional, outline, view of an aerobic biological filtering apparatus which cleans by a method employing a floating filter medium 4a, with reference numeral 1' denoting a treating tank, 3' being an air pipe, 4 being a filter layer 4, 4a being the floating filter medium (and elements thereof), 7 being a crude water feed pipe, 8' being a sludge (or wastewater) discharge pipe, 9' being a cleaning water discharge valve, 10 being a filter medium blocking plate, 16 being crude water, 17 being treated water, 7a being a crude water feed valve, and 8a being an excess sludge discharge valve.

The treating tank 1' is made of steel plate or synthetic resin material, with a treated water discharge port 1a being provided in an upper part thereof, and a crude water feed port 1b in a lower part. In an inner upper part of the treating tank 1', the porous filter medium block plate 10 is disposed horizontally to prevent the floating filter medium 4a from flowing out.

Near the bottom in the treating tank 1', the crude water feed pipe 7 has multiple tiny holes.

The sludge discharge pipe 8' is disposed below the crude water feed pipe 7.

Furthermore, the air pipe 3' is provided above and near the crude water feed pipe 7, and a proper volume of air is fed into the tank 1 through the air pipe 3' to maintain an aerobic atmosphere in the tank 1'.

In this embodiment, only one air pipe 3' is disposed at the bottom of the tank, but another air pipe (not shown) may also be disposed in the middle of the treating tank 1', so that air may be supplied from both the bottom and middle of the tank 1'.

Although the treating tank 1' is used as an aerobic treating tank by aerobic microorganisms in this embodiment, the treating tank 1' may also be used as an angerobic treating tank.

Further, in the embodiment of FIG. 1, crude water passes through the filtering tank in an upward flow, but, of course, it may also be caused to pass in a downward flow.

Figure 2:
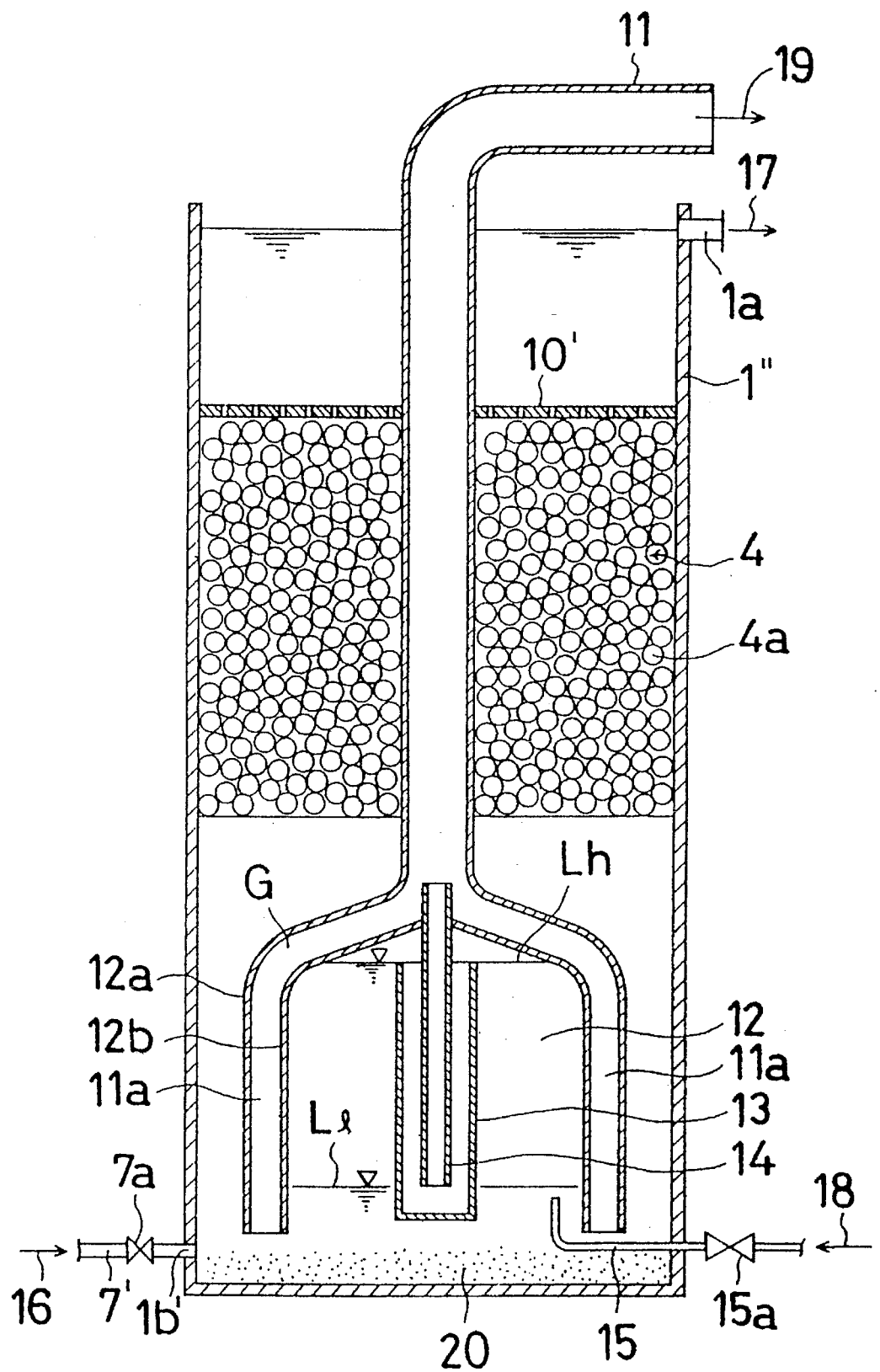
FIG. 2 is a longitudinal cross-sectional, outline, view of a biological treating apparatus according to a second embodiment of the invention.

FIG. 2 is a longitudinal, sectional, outline, view of a second embodiment biological-filtering apparatus for carrying out the cleaning method of this invention employing a floating filter medium. In FIG. 2, reference numeral 1" denotes a treating tank, 4 is a filter layer, 4a is a floating filter medium, 7' is a crude water feed pipe, 10' is a filter medium block plate, 11 is a cleaning water discharge pipe, 12 is an air sump, 13 is a water seal, 14 is an air injection pipe, 15 is a cleaning air feed pipe, 16 is crude water, 17 is treated water, 18 is cleaning air, 19 is cleaning discharge water, and 20 is excess sludge.

The treating tank 1" is made of steel plate or synthetic resin material, with a treated water discharge port 1a being provided in an upper part thereof, and a crude water feed port 1b' in a lower part. At an inner upper part of the treating tank 1", the porous filter medium block plate 10 is disposed horizontally, and the floating filter medium 4a is thereby prevented from flowing out.

In this embodiment, an air pipe (not shown) is disposed at the bottom of the treating tank 1" and the treating tank 1" is used as an aerobic treating tank by aerobic microorganisms; but the treating tank 1" may also be used as anaerobic treating tank by anaerobic microorganisms.

Further, in the embodiment of FIG. 2, crude water passes through the filtering tank in an upward flow, but, of course, it may pass in a downward flow.

The floating filter medium 4a for biological filtration is formed of small spheres or elements, of foamed polystyrol, the diameters of the elements being selected in a range of from about 1 to 15 mm $\phi$.

Any porous material with specific gravity of about 0.3 or less may be used as the material for the floating filter medium 4a, such as pumice and Shirasu balloon, with foamed polystyrol and urethane resin being preferred. If the specific gravity of the filter medium 4a exceeds 0.3, the filter layer 4 will not sufficiently spread during cleaning.

The diameters of the spherical elements of the floating filter medium 4a are preferably about 1 to 15 mm $\phi$, and if smaller than 1 mm, there are problems in growth of biological membrane or blocking of flow through the filter medium 4a, or if larger than 15 mm $\phi$, there are problems with fluidity (flow) in the treating tank 1" and/or there is a drop in cleaning performance during cleaning.

Furthermore, the shape of each element of the floating filter medium 4a should be ideally spherical from the point-of-view of wastewater flow and peeling off of deposits during cleaning. It may, however, also have the shapes of a cube, a rectangular parallelepiped, an elliptical sphere, and the like.

The treating tank 1" is filled with floating filter medium 4a to a height of about 500 to 1500 mm. If the filter medium height is less than 500 mm, filtering performance drops abruptly. Contrary to this, when the filter medium height exceeds 1500 mm, it is difficult to clean the filer medium, and hence it is appropriate to fill it to have a height of from 500 mm to 1500 mm.

The air sump 12 is a container open at a lower side of a double wall structure, and is disposed near the bottom of the treating tank 1". A gap G, between the double walls 12a, 12b, which form the air sump 12, forms a discharge passage 11a of the cleaning discharge water 19 as will be explained below.

A volume of the air sump 12 is determined by overall dimensions of the treating tank 1" or by a volume of the filter layer, and when the volume of the filter layer is 0.1 to 1.0 mm$^3$, it is selected to be about 30 to 200 liters.

In the second embodiment of FIG. 2, the air sump 12 is a double wall structure, and the gap between the walls is the cleaning water discharge passage 11a, but, instead of this, a branch pipe communicating with the cleaning water discharge pipe 11 could be affixed to an outer circumference of the double wall structure of the air sump 12 to form a discharge passage for the cleaning discharge water 19.

The cylindrical water seal 13, having a specified length and being sealed at its lower end, is disposed inside the air sump 12 to be aligned with, and placed on, the air injection pipe 14, whoes lower end is open.

The cleaning water discharge pipe 11 is arranged approximately in the middle of the treating tank 1", with its lower end communicating with an upper part of the air sump 12 so as to communicate with the discharge passage 11a formed by the double walls 12a, 12b.

The upper end of the air injection pipe 14 penetrates, air-tightly, through the inner wall 12b of the air sump 12, to extend into a lower end of the cleaning water discharge pipe 11.

The cleaning water discharge pipe 11 is made of a synthetic resin pipe of 50A to 100A.

An inner end of the cleaning air feed pipe 15 opens into the air sump 12, with injected air therefrom being sequentially deposited in the upper space of the sump 12.

Figure 3:
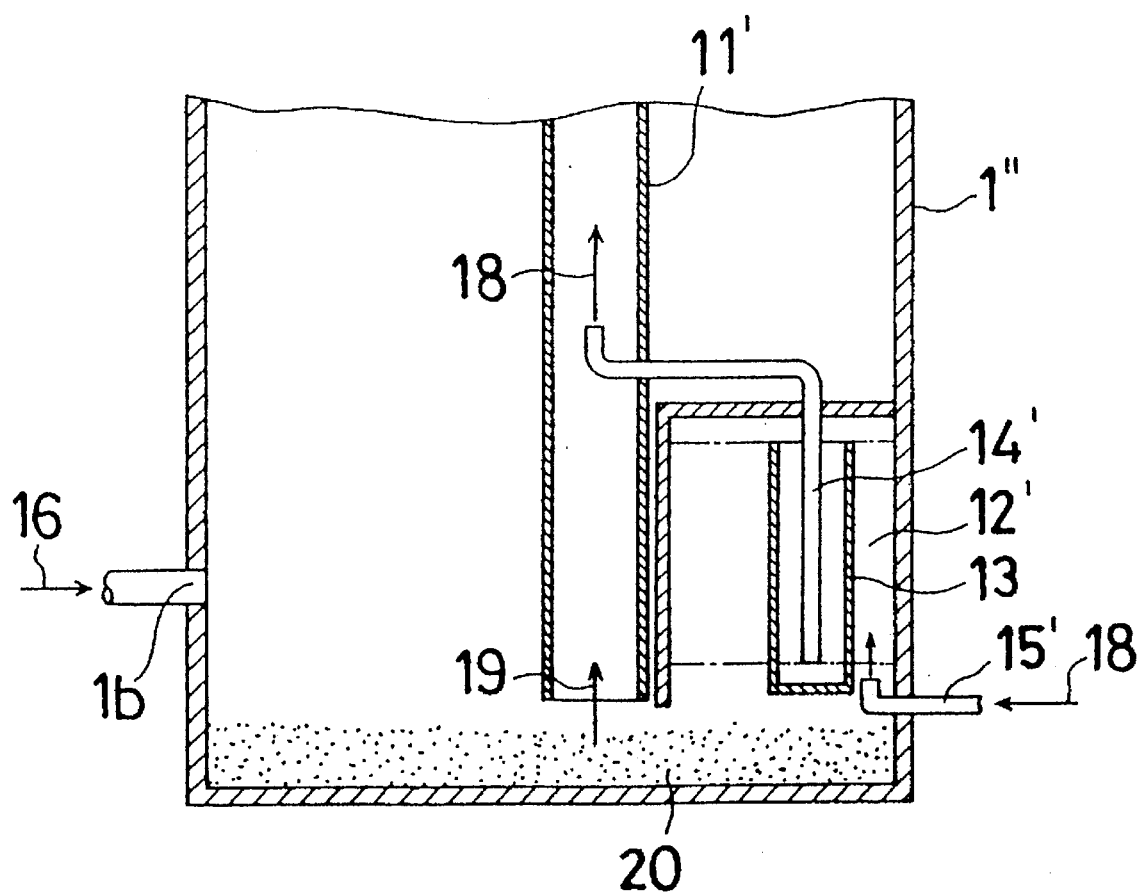
FIG. 3 is a longitudinal cross-sectional, outline, view showing another embodiment of an air sump used with this invention.

In this embodiment, as mentioned above, the air sump 12 is a double wall structure, but, as shown in FIG. 3, an air sump 12' may also be formed using an outer wall of a treating tank 1" with a front end opening of an air injection pipe 14' being placed in a lower inner portion of a cleaning water discharge pipe 11' and being directed upwardly.

Operation of the biological filtering apparatus of the invention is described below with reference to FIGS. 1–3.

Looking first at the first embodiment of FIG. 1, the crude water 16 to be treated is supplied from a crude water pump (not shown) into the crude water feed pipe 7 and is discharge into the treating tank 1'.

The discharge crude water 16 passes as an upward stream through gaps in the floating filter medium 4a for biological filtration, and, in this process, membranes formed in advance on the outer surfaces of elements of the floating filter medium 4a, biologically filter, treat and remove solid and organic matter from the crude water 16.

The treated water 17, which was treated while passing through the floating filter medium 4a, passes through the filter medium blocking plate 10, reaches an upper part of the treating tank 1' and is discharged outside the tank through the treated water discharge port 1a.

When the biological treating tank 1' is operated for about 24 to 48 hours, the floating filter medium 4a in the treating tank must be cleaned.

During cleaning, according to the first embodiment of the invention shown in FIG. 1, first the crude water feed valve 7a of the crude water feed pipe 7 is closed, and then the cleaning water discharge valve 9' is opened.

An opening stop of the valve is arranged so that when the discharge valve 9' is fully opened, the water equivalent of about 0.7 times (i.e. 7/10 of) the filling volume of the filter medium will be discharged from the treating tank 1', in about ten seconds. As a result, as mentioned above, the filter layer 4 slightly descends, as one entire body, from an initial state shown in FIG. 1, to a lowered state shown in FIG. 4.

Figure 5:
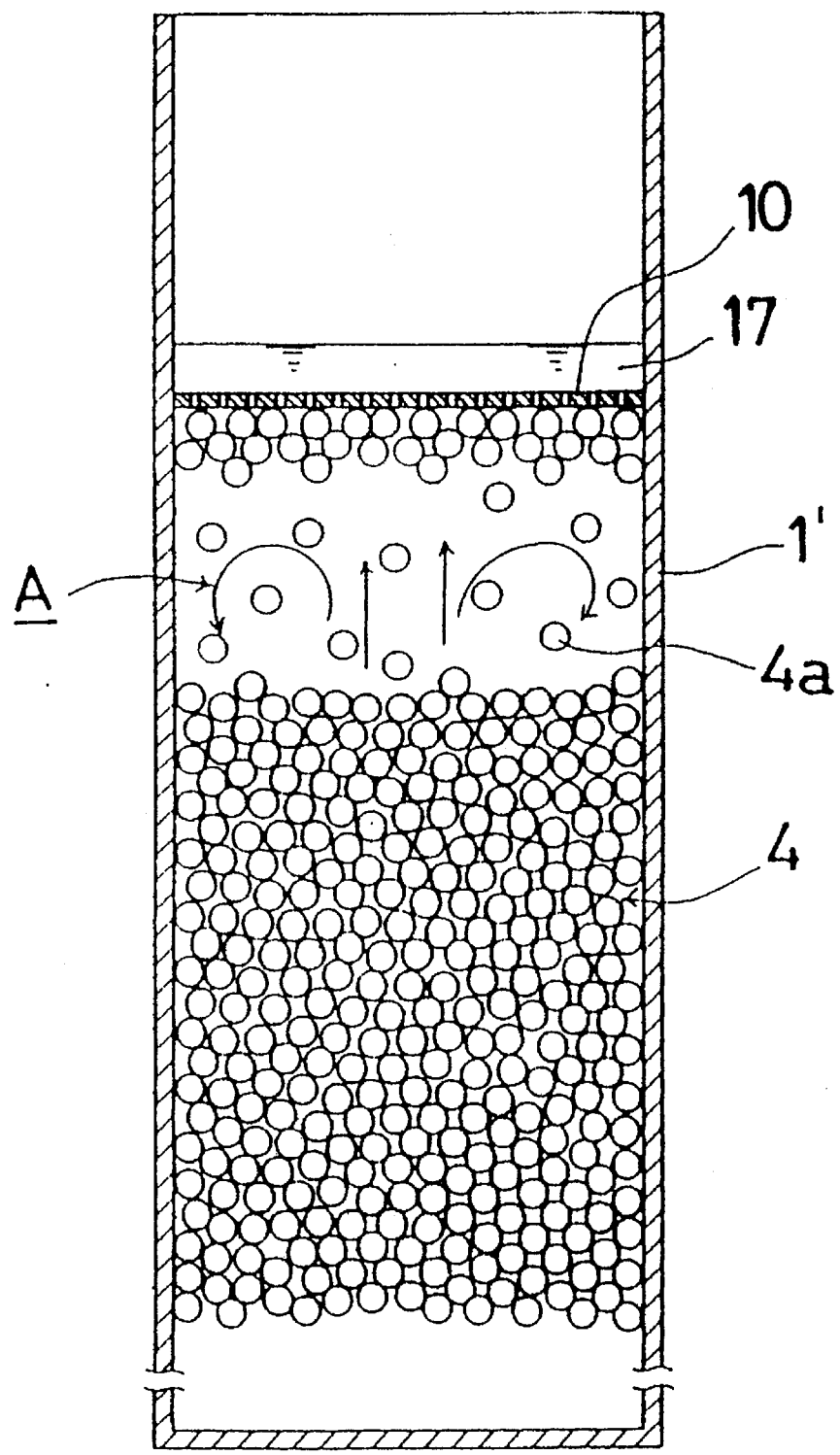
FIG. 5 is a view similar to FIG. 4, but illustrating a spreading state of the filter layer.
Figure 6:
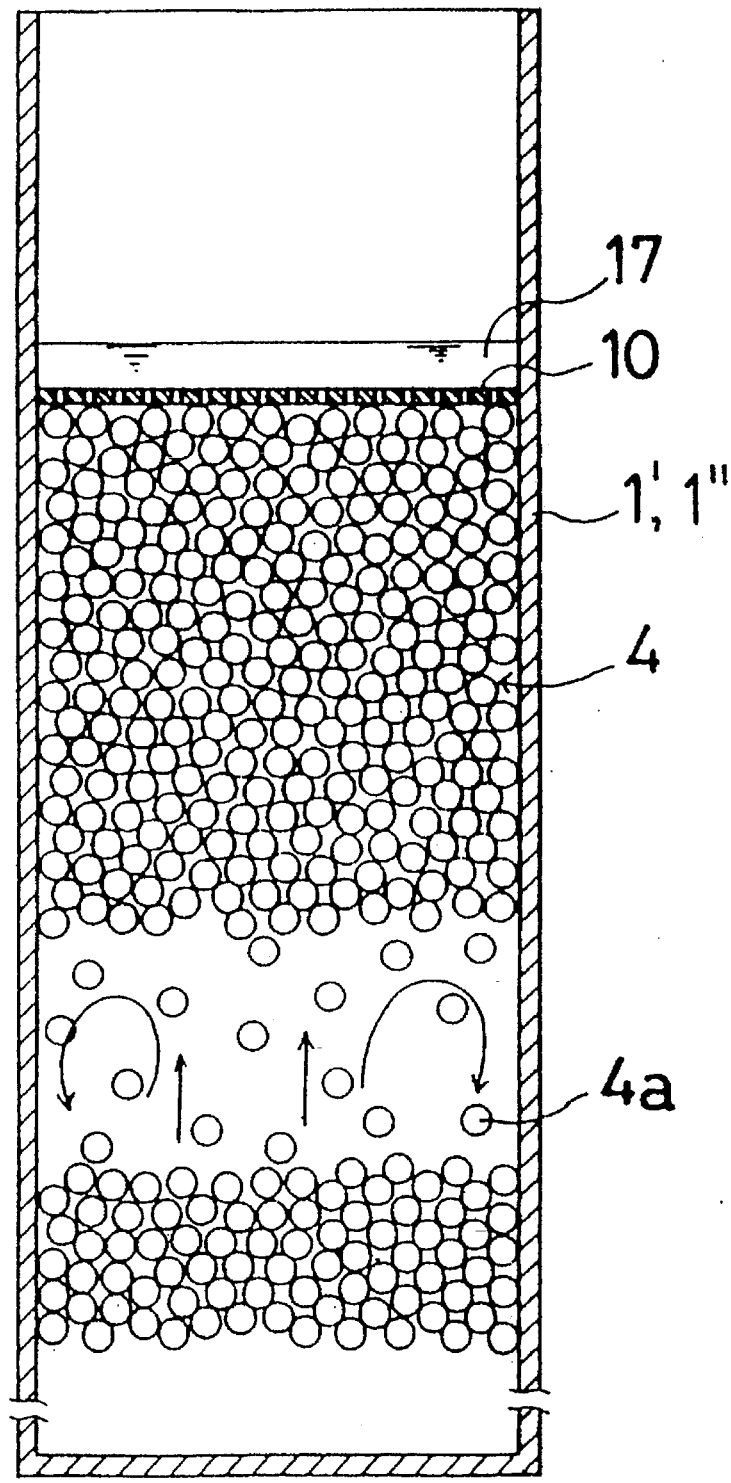
FIG. 6 is a view similar to FIGS. 4 and 5 illustrating an expanding process of the spreading state of the filter layer.

Afterwards, in an inner upper part of the lowered filter layer 5, as will be further explained below, a vortex agitation region A appears as shown in FIG. 5, and this region expands rapidly downwardly, sequentially, until finally a lowest portion of the filter layer 4 is broken into pieces as shown in FIG. 6, so that the entire filter layer 4 has been spread and diffused into pieces.

The water in the treating tank 1' is discharged continuously while the vortex agitation region expands, and when the lowest portion of the entire filter layer 4 is spread, or slightly before or after this, discharge of water is stopped.

In this first embodiment, the water is discharged from the treating tank 1' by opening the discharge valve 9' but one side of a siphon pipe may also be set at the lower part of the treating tank 1' so that the water may be discharged rapidly from the lower part of the treating tank 1' to outside the tank by using this so-called siphon pipe.

Figure 7:
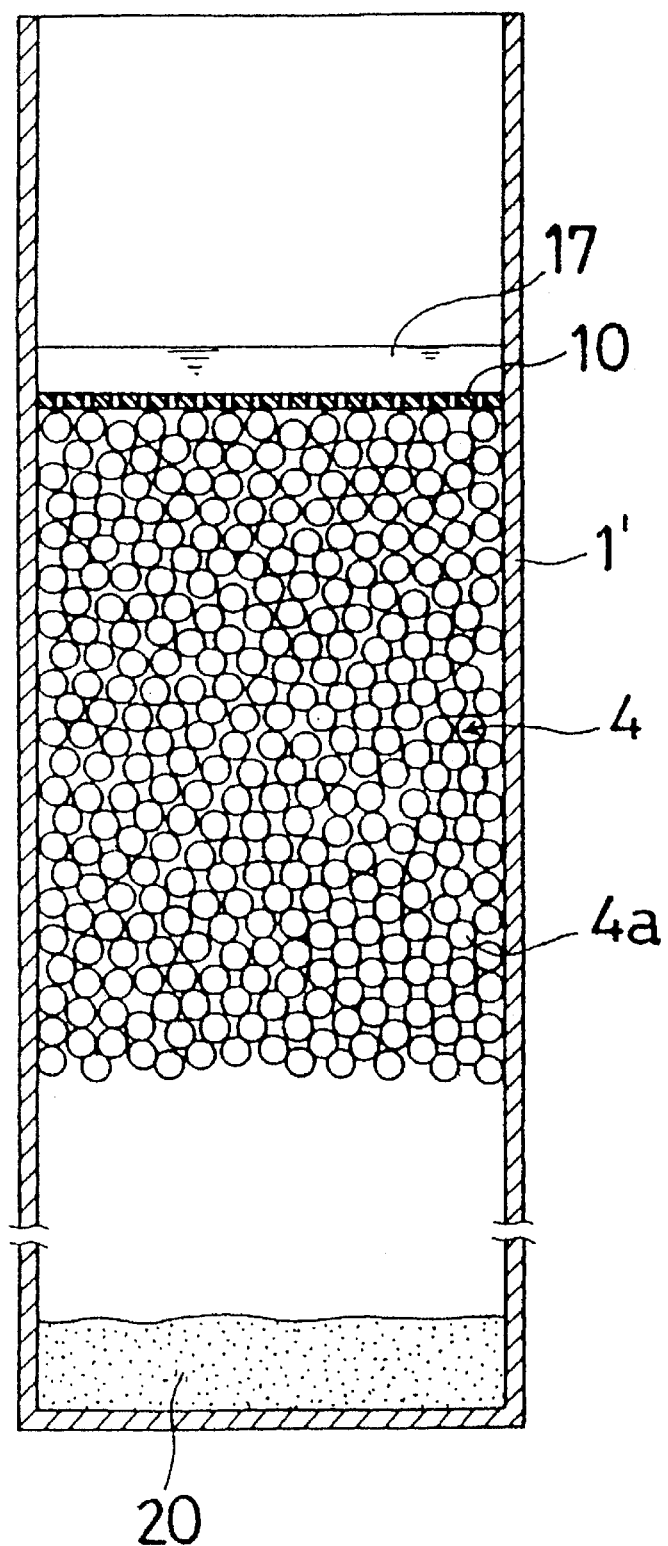
FIG. 7 is a view similar to FIGS. 4—6 illustrating a reformed state of the filter layer, once collected again after the whole filter layer has spread.

Each element of the filter medium 4a, once it has spread into pieces, floats upward sequentially by its buoyancy, and assembles once again, so that the filter layer 4 is again formed, as shown in FIG. 7.

Further, with the vortex agitation motion of each element of the filter medium 4a, the excess sludge 20 is peeled and separated from outer surfaces of elements of the filter medium, to sequentially settle in the bottom of the treating tank 1'.

Furthermore, as required, treated water is supplied from above the filter layer 4 to raise the liquid level in the treating tank 1' so that the separated sludge deposits from the outer surfaces of the elements of the filter medium may be completely separated to settle downwardly.

The settling excess sludge 20 is drawn out of the tank 1' through the sludge discharge pipe 8'.

On the other hand, according to the second embodiment of the invention shown in FIG. 2, during cleaning, first the crude water feed valve 7a of the crude water feed pipe 7' is closed, and the air feed valve 15a of cleaning air feed pipe 15 is opened. As a result, the cleaning air 18 is supplied into the air sump 12. As air 18 accumulates in the air sump 12, the liquid level Lh in the air sump 12 drops sequentially.

As this descent of the liquid level advances to reach the liquid level Ll, a water seal of the water seal 13 is broken, and the air 18 in the air sump 12 passes through the air injection pipe 14 to be instantly discharged into the cleaning water discharge pipe 11.

When the air 18 in the air sump 12 is quickly injected into the lower inner part of the cleaning water discharge pipe 11, water is sucked up into the cleaning water discharge pipe 11 through the discharge passage 11a from the bottom of the treating tank 1", like a water pistol, and is discharge outside the treating tank 1" from the upper end opening of the cleaning water discharge pipe 11.

As the air 18 is discharged, the water in the bottom of the treating tank flows instantly into the air sump 12, and the water sealing action of the water seal 13 is recovered.

When water is discharged through the air injection pipe 14, the air feed control valve 15a is closed, thereby completing cleaning of the floating filter medium, as is further described below.

If necessary, however, feeding of cleaning air 18 may be successively continued, with the instantaneous injection of air 18 being repeated.

By controlling the opening degree of the air feed control valve 15a, the interval of instantaneous injection of cleaning air 18, i.e. the interval of the back washing of the filter medium, may be controlled.

Thus, as the air 18 in the air sump 12 is discharged, instantaneously, the water in the bottom of the treating tank is discharged, and flows into the air sump 12.

Figure 4:
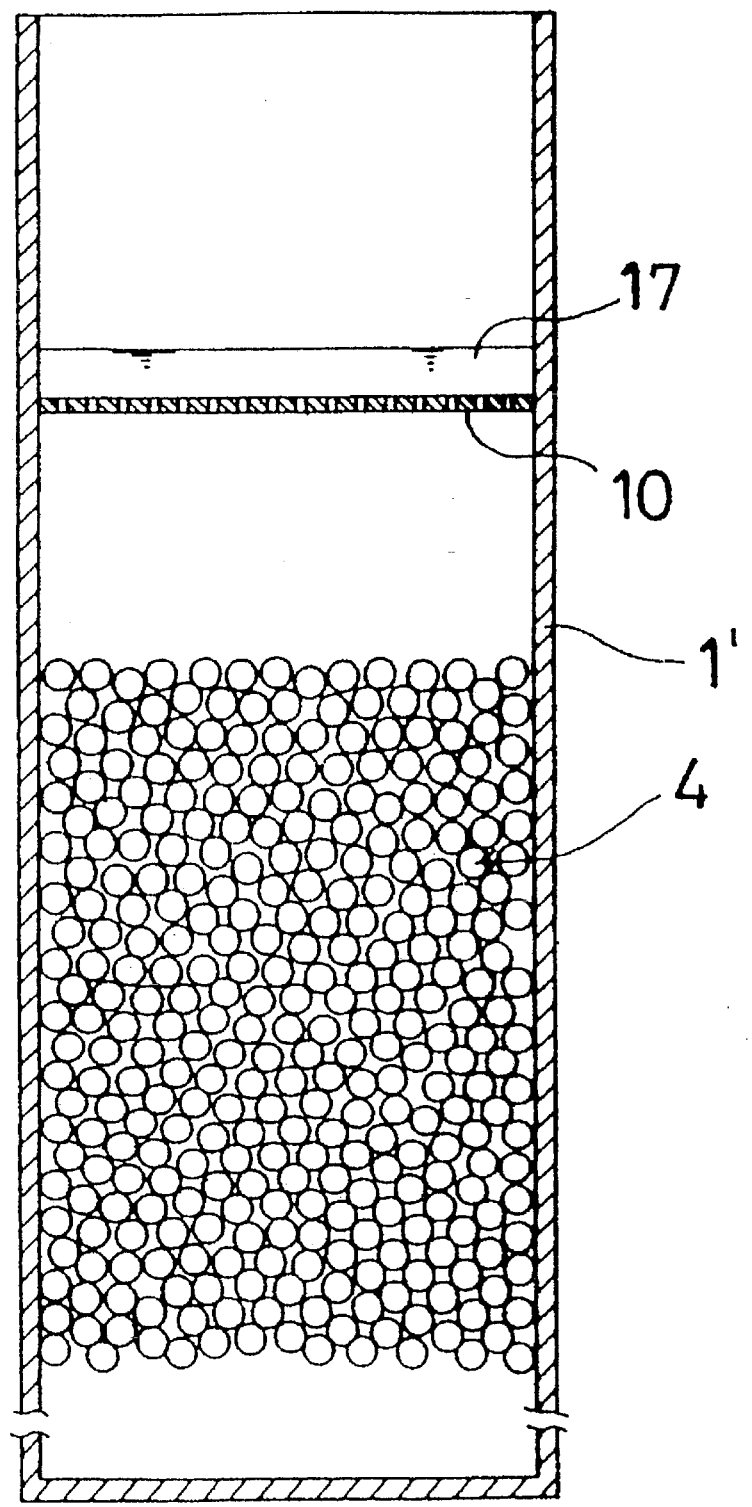
FIG. 4 is a longitudinal, sectional, fragmented, view of a biological treating apparatus of the invention illustrating a filter layer after elapse of a certain amount of time from start of cleaning.

In this second embodiment, the size of the air sump 12 is arranged so that the water equivalent of about 0.7 times the filling (displacing) amount of the filter medium is discharged from the bottom of the tank, and flows into the air sump by injection of air, in about 3 seconds. As a result, as mentioned above, the filter layer 4 slightly drops, as one body, from its initial state, as shown in FIG. 2, to its lowered state, as shown in FIG. 4.

Afterwards, in the upper part of the lowered filter layer 4, the vortex agitation region A appears as shown in FIG. 5, and this region is rapidly expanded downwardly, sequentially, and finally the lowest portion of the filter layer 4 is loosened as shown in FIG. 6, and the entire filter layer 4 is spread and loosely diffused at least once.

Drop of water level in the treating tank 1" continues while the vortex agitation region is expanding, and when the lowest portion of the entire filter layer 4 is spread, or slightly before or after this, drop of the water level is stopped.

The loosely spread filter medium 4a floats upwardly, sequentially, because of its buoyancy, and assembles again, so that the filter layer 4 is again formed as shown in FIG. 7.

In FIGS. 4 to 7, the cleaning water discharge pipe 11 and air sump 12 are omitted for the sake of simplicity.

The excess sludge 20 peeled and separated from the outer surfaces of elements of the filter medium, which is caused by the vortex agitation motion of each element of filter medium 4a, sequentially settles to the bottom of the treating tank 1".

Furthermore, treated water is supplied, as required, from above the filter layer 4 to raise the liquid level in the treating tank 1", so that the separated sludge deposits from the outer surface of the elements of the filter medium can be completely settled and separated downwardly.

The settling excess sludge 20 is drawn out of the tank together with the cleaning discharge water 19 through the cleaning water discharge pipe 11, 11'.

Discharge of cleaning water from the treating tank 1", and flow of water into the air sump 12 should be preferably controlled so as to permit the discharge and flow of water equivalent to 0.5 to 1.5 times a filling, or displacement, amount of the filter medium, in 1 to 90 seconds. It is most preferable, as shown from actual tests, to cause the discharge and flow of water equivalent of from to 0.7 to 1.5 times in 2 to 20 seconds, from viewpoints of cleaning performance and overall treating capacity of the treating apparatus.

If the discharge and in-flow amounts are less than 0.5 times the volume of the filter medium, there are problems in the lowering speed of water level in the treating tank 1" and cleaning time, thus, sufficient cleaning cannot be expected. If the discharge and flow-in amounts are over 1.5 times, time and labor in after-treatment of cleaning water is required, and overall treating performance is thereby lowered, while cleaning is excessive.

Similarly, if the discharge time is shorter than 1 second, sufficient spreading time of filter medium is not obtained, and a degree of cleaning thereby achieved is insufficient. To the contrary, if it takes more than 90 seconds, the vortex agitation phenomenon of filter medium does not take place, or excessive cleaning occurs, and a nitrification action by nitrogen components is weak and a denitration effect drops, among other problems.

When a filter medium 4a was formed of foamed styrol spheres having a specific gravity of 0.05 and a diameter of 4 mm φ was used, and a treating tank 1" having 600 mm φ diameter was filled with the filter medium 4a to form a filter layer 4 which was 700 mm in height, and when, during use of this treating apparatus, crude water 16 with BOD of 200 ppm and SS of 100 ppm was passed from the bottom of the filter layer 4 in an upward flow at a flow rate of 4 liters/m, a mean BOD of treated water 17 was 5 ppm with a SS of 3 ppm. After 48-hour continuous operation, the pressure loss at the filter layer 4 was about 350 mm $H_2O$.

On the other hand, the filter layer 4, after 48-hour use, was cleaned by discharging water of 0.7 times the filling (displacing) amount (volume) of the filter medium, taking about 3 seconds when flowing into the air sump 12, 12' and the filter resistance was recovered up to 10 mm $H_2O$. Thereafter, by similarly cleaning the filter layer 4 every 48 hours, crude water 16 was treated continuously while keeping a nearly constant quality of treated water.

When this was done, the inside diameter of the cleaning water discharge pipe 11 was about 65 mm φ, and the inner volume of the air sump 12 was about 100 liters.

Figure 8:
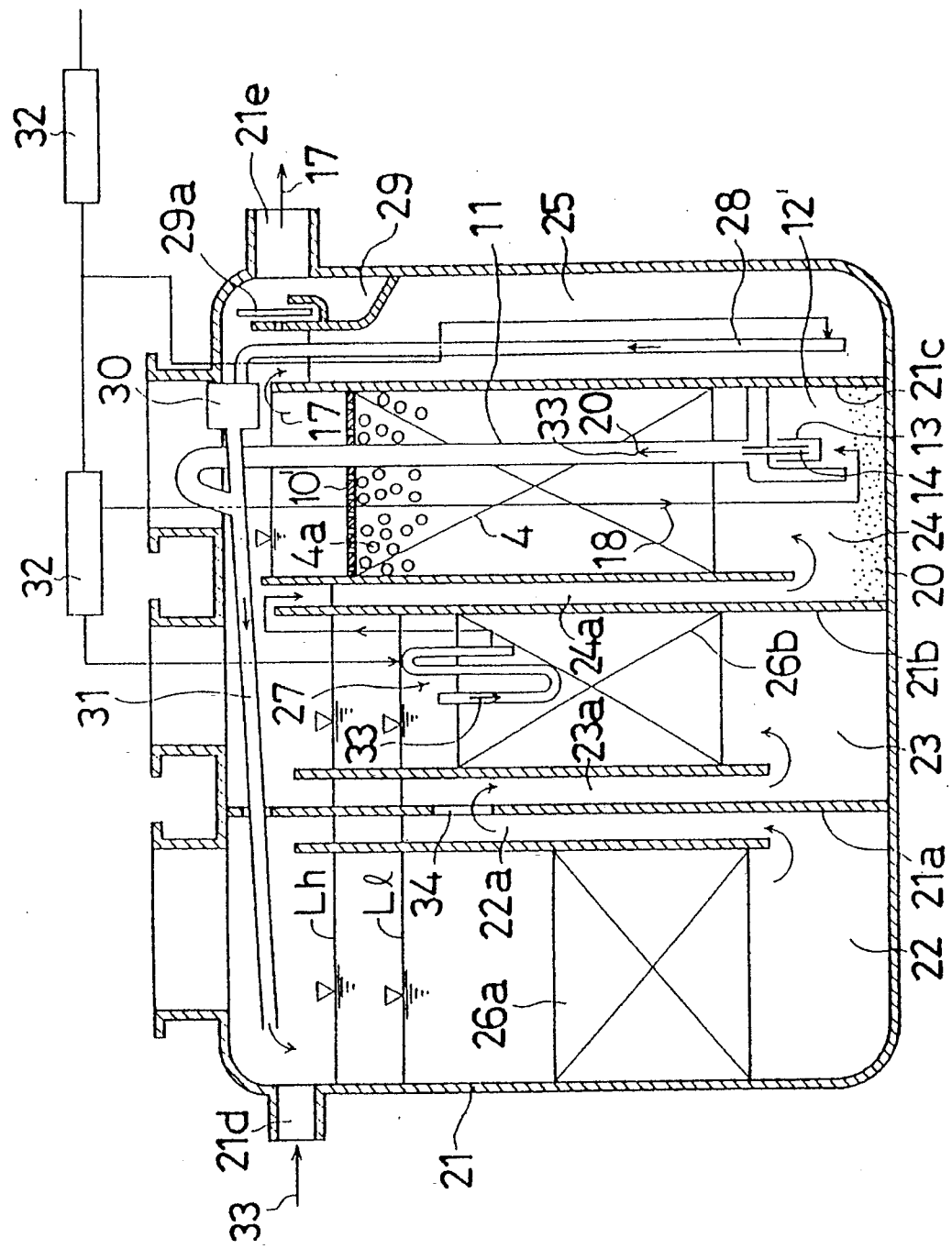
FIG. 8 is a longitudinal, cross-sectional, schematic, view of a first example of a wastewater purifying tank employing this invention.

FIG. 8 is a longitudinal sectional view showing an example of a wastewater purifying tank employing principles of this invention. In this drawing, reference numeral 21 is a purifying tank main body, which is sectioned by partition walls 21a, 21b, 21c to form an anaerobic filter bed first chamber 22, an anaerobic filter bed second chamber 23, a biological filter chamber 24, and a treated water chamber 25.

Anaerobic filter beds 26a, 26b are provided in the anaerobic filter bed first chamber 22 and anaerobic filter bed second chamber 23 while a floating filter medium 4a is placed, to form a filter layer 4, in the biological filter chamber 24, same as in FIG. 1.

In FIG. 8, reference numeral 27 is an air drive type flow rate adjusting pump, 28 is an air lift pump for circulating treated water, 29 is a disinfection chamber, 29a is a chemical cylinder, 30 is a flow rate adjusting meter, 31 is a circulation water path, 32 is a blower, 10' is a filter medium blocking plate, 11 is a cleaning water discharge pipe, 12 is an air sump, 13 is a water seal, and 14 is an air injection pipe.

Wastewater 33 flowing in from a crude water inlet 21d circulates in a sequence through the anaerobic filter bed first chamber 22, through a passage 22a, through an opening 34, through a passage 23a, and through the anaerobic filter bed second chamber 23, and undergoes specific anaerobic treatment.

The wastewater 33, in the anaerobic filter bed second chamber 23, is fed into the biological filter chamber 24 through the flow rate adjusting pump 27, and flows through a passage 24a to pass through the filter layer 4 in an upward flow.

The treated water 17, which is biologically filtered and treated while circulating through the filter layer 4 in the biological filter chamber 24, is sequentially transferred into the treated water chamber 25, disinfected in the disinfection chamber 29, and is discharged outside the tank through a discharge port 21e.

Treated water 17 in the treated water chamber 25 passes through the air lift pump 28, the flow rate adjusting meter 30, and the circulation water path 31, and only a specified volume circulates into the anaerobic filter bed first chamber 22, so that the waste level in both of the anaerobic filter bed chambers 22, 23 is held somewhere between Lh and Ll.

When the filter resistance of the filter layer 4 in the biological filter chamber 24 reaches a specific value, or a preset filter treating time expires, a supply of cleaning air 18 is pumped from the blower 32 into the air sump 12, and the water sealing of the water seal 13 is broken.

As a result, wastewater 33 is discharged from the bottom of the biological filter chamber 24 through the cleaning water discharge pipe 11, and wastewater 33 also flows again into the air sump 12, with the floating filter medium 4a forming the filter layer 4 being cleaned in the same manner as explained for the embodiments of FIGS. 1–3.

The excess sludge 20, removed from the filter medium 4a by cleaning, is collected in the bottom of the biological treating chamber 24, and is returned into the anaerobic filter bed first chamber 22, together with the wastewater discharged through the cleaning water discharge pipe 11 at the time of back washing.

Figure 9:
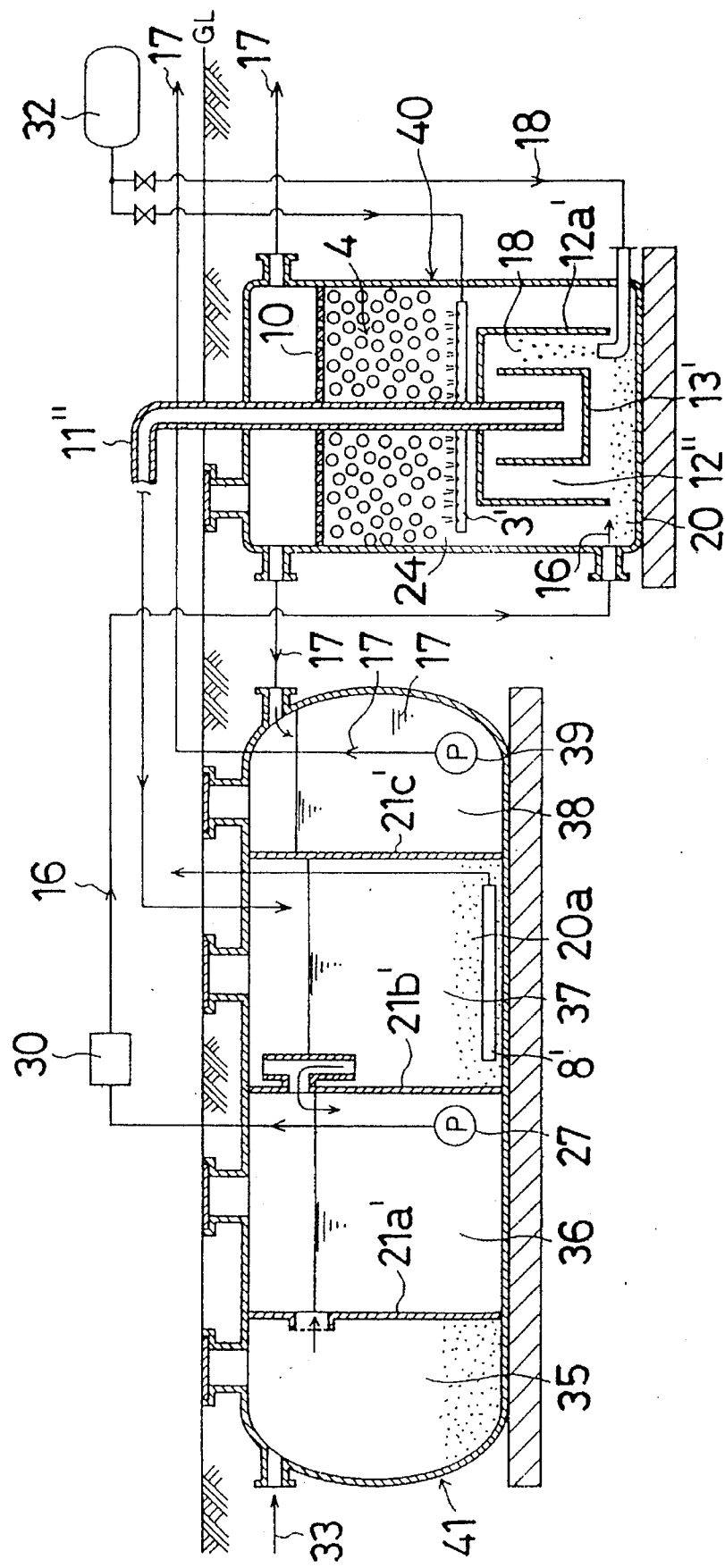
FIG. 9 is a longitudinal, cross-sectional, schematic view of a second example of a wastewater purifying tank employing this invention; and, FIG. 10 is an explanatory diagram of a structure illustrating a cleaning method for a floating filer medium of a biological treating apparatus in the prior art.
Figure 10:
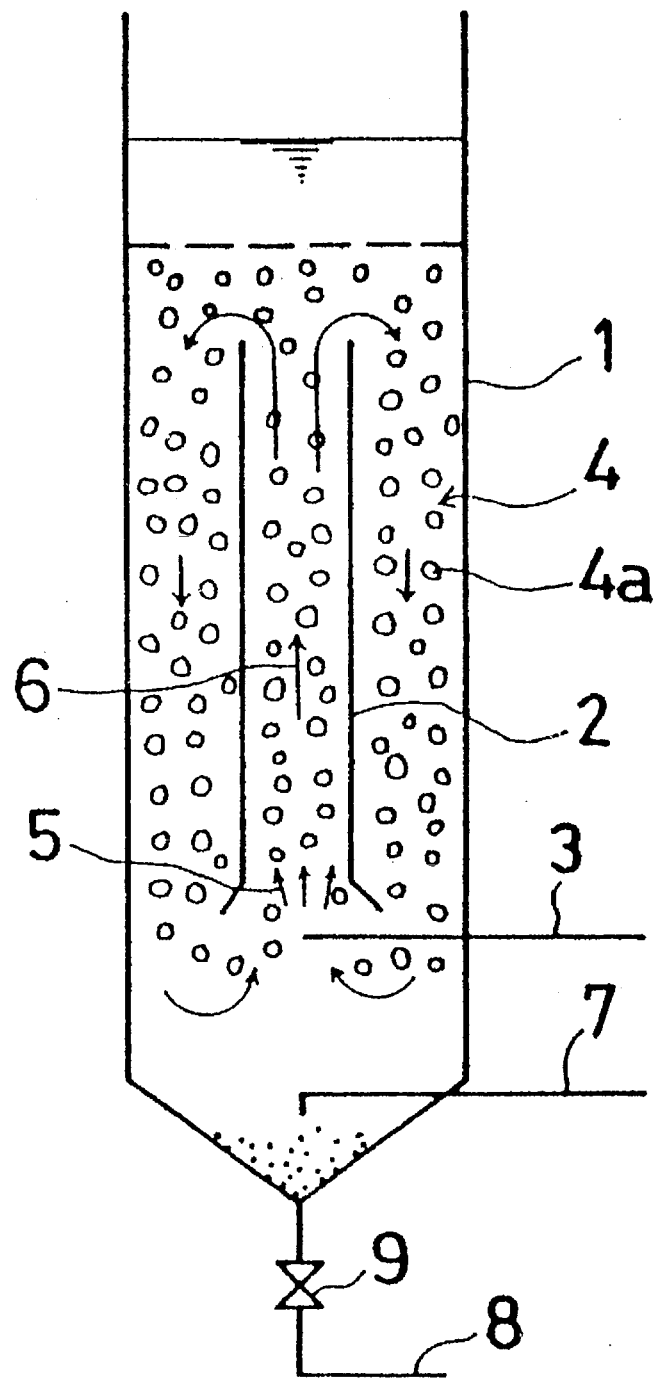

FIG. 9 shows another embodiment of a wastewater purifying tank according to the invention. In FIG. 9, a biological filtering treating tank 40 is formed as an independent buried type, and is used in combination with a tank main body 41 comprising a sand sedimentation chamber 35, a flow rate regulator 36, a sludge enriching and storage chamber 37, and a treated water storage chamber 38. The tank's main body 41 is in a cylindrical form made of synthetic resin, and the chambers 35, 36, 37, 38 are formed by partition walls 21a', 21b', 21c'.

In FIG. 9, reference numeral 3' is an air pipe, 4 is a filter layer, 8' is a sludge extracting pipe, 11" is a cleaning water discharge pipe, 12" is an air sump, 13' is a water seal, 16 is crude water, 17 is treated water, 18 is cleaning air, 20 is excess sludge, 20a is enriched sludge, 27 is a flow rate adjusting pump, 30 is a flow meter, 32 is a blower, 33 is wastewater, and 39 is a discharge pump.

In this embodiment, construction of the water seal 13' and air sump 12" is simplified in comparison with the embodiments of FIG. 2 and FIG. 3 in that the water seal 13' is formed inside a case main body 12a' forming the air sump 12" and the lower end of the cleaning water discharge pipe 11" is inserted into the water seal 13'.

The purifying process of supplied wastewater 33 and back washing of the filter layer 4 in the biological filter chamber 24 are nearly the same as in the case of the wastewater purifying tank in FIG. 8, and an explanation is therefore omitted herein.

In the invention, as described above, the floating filter medium is made of granules in particle size of 1 to 15 mm, having a specific gravity of 0.3, or less, so as to have an extremely different specific gravity than that of water, and the filter layer, made of such a filter medium, is cleaned by allowing water of 0.5 to 1.5 times the filling amount of the filter medium to be discharged from the bottom of the filter layer within a specific time and flow into the air sump.

As a result, a vortex agitation motion caused by the large buoyancy of each element of the filter medium is generated in the inner upper part of the filter layer, which has been lowered by water discharged at the time of cleaning, and the filter layer is sequentially loosened from its inside and broken into pieces, and floats up again while making violent agitating motions, to finally collect and form the filter layer again.

Accordingly, the excess sludge deposited on each filter medium element is easily peeled and separated at the time each filter medium element is agitated and floated, and the filter layer is thusly efficiently cleaned to a desired degree of cleaning with a small volume of cleaning discharge water.

The peeled and separated excess sludge sediments in the bottom of the treating tank are easily drawn out of the treating tank, together with the cleaning discharge water at the time of cleaning of the filter medium.

Furthermore, by adjusting the flow rate of the cleaning air to be supplied into the air sump, an interval of back washing operation of the filter medium, and the number of times of continuous back washing, can be freely selected. This is very convenient.

Thus, according to the invention, the filter layer, which is hard to spread because of small specific gravity can be efficiently cleaned with a small volume of cleaning water, thereby bringing about an excellent practical effect without increasing the size of the treating apparatus, unlike conventional prior art biological filtering treating apparatus which have additional mechanisms for filter medium cleaning.

The present inventor measured the relationship between fluidity status and wastewater flow velocity for a granular floating filter medium for biological filtering apparatus of extremely light weight (made of foam plastics or the like), and discovered the phenomenon, that when the water in the filter layer (composed of the floating filter medium suspended in water) is withdrawn downwardly at a flow velocity in a specific range, the filter layer itself is slightly lowered together with the water, and the filter medium begins to spread at its upper portion inside the filter layer, and that the filter medium, in a specific thickness range, gets loose while rotating violently, this loosening, or spreading, moves sequentially from the inner upper part to the inner lower part of the filter medium, and finally the entire region of the filter medium has been spread.

The invention was made by repeating numerous floating filter medium cleaning tests on the basis of such finding, and is grounded on a specific relationship between the specific gravity and particle size of the floating filter medium forming the filter layer (filling layer) and a flow rate of the cleaning water discharged from beneath the filter layer in a cleaning operation, so that the entire region of the filter layer may be spread efficiently with a small volume of cleaning water, thereby completely separating and removing the excess sludge deposited on the floating filter medium.

We claim:

1. A method of preparing and cleaning a floating filter medium for a biological cleaning apparatus, comprising the steps of:

forming a filter layer by placing in a treating tank a granular floating filter medium having a specific gravity of about 0.3 or less and a particle size of 1 to 15 mm;

allowing wastewater to enter said treating tank and flow through the filter layer;

separating and removing excess sludge from the filter medium by discharging an amount of water from the treating tank, from below the filter layer, equivalent to 0.5 to 1.5 times the filling amount of the filter medium in a time of between 5 to 90 seconds.

2. A method of preparing and cleaning a floating filter medium as in claim 1, wherein the filter medium is formed of foam plastic granules.

3. A method of preparing and cleaning a floating filter medium as in claim 1 wherein the treating tank is held in one of an anaerobic and aerobic state.

4. A method of preparing and cleaning a floating filter medium as in claim 1, wherein the water in the treating tank is discharged from the treating tank using a siphon pipe positioned under the filter layer.

5. A method of preparing and cleaning a floating filter medium for biological cleaning apparatus comprising the steps of:

forming a filter layer by placing in a treating tank a granular floating filter medium of specific gravity of about 0.3 or less and a particle sizes of 1 to 15 mm;

allowing wastewater to enter said treating tank and pass through the filter layer;

separating and removing excess sludge from the filter medium by:

setting up a cleaning discharge water pipe in the treating tank, with its lower end confronting a bottom of the treating tank;

forming an air sump at the bottom of the treating tank, with a water seal being provided therein;

inserting an air injection pipe into the water seal, with its upper end communicating with the lower inner part of the cleaning discharge water pipe;

supplying air into the air sump to break a water sealing capacity of the water seal and to therefore allow air in the air sump to spurt instantly into the cleaning discharge water pipe through the air injection pipe;

and allowing an amount of water in the treating tank equivalent to 0.5 to 1.5 times a filling amount of the filter medium to be discharged outside the treating tank from the lower part of the treating tank in 1 to 90 seconds and to flow into the air sump.

6. A method of preparing and cleaning a floating filter medium as in claim 5, wherein the filter medium is formed of foamed plastic granules.

7. A method of preparing and cleaning a floating filter medium as in claim 5 wherein the treating tank is held in one of a anaerobic and aerobic state.

8. A method of preparing and cleaning a floating filter medium as in claim 5, wherein the water in the treating tank is discharged from the treating tank using a siphon pipe positioned under the filter layer.

* * * * *